United States Patent
Gao et al.

(10) Patent No.: US 11,689,630 B2
(45) Date of Patent: Jun. 27, 2023

(54) REQUEST PROCESSING METHOD AND APPARATUS, ELECTRONIC DEVICE, AND COMPUTER STORAGE MEDIUM

(71) Applicant: Beijing Baidu Netcom Science and Technology Co., Ltd., Beijing (CN)

(72) Inventors: Yan Gao, Beijing (CN); Yixing Sun, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 22 days.

(21) Appl. No.: 17/243,639

(22) Filed: Apr. 29, 2021

(65) Prior Publication Data

US 2021/0274017 A1      Sep. 2, 2021

(30) Foreign Application Priority Data

Jun. 29, 2020   (CN) .......................... 202010603582.8

(51) Int. Cl.
*H04L 67/00* (2022.01)
*G06F 8/41* (2018.01)
(Continued)

(52) U.S. Cl.
CPC ................ *H04L 67/34* (2013.01); *G06F 8/43* (2013.01); *G06F 9/45558* (2013.01); *G06F 9/505* (2013.01); *G06F 21/566* (2013.01)

(58) Field of Classification Search
CPC ......... H04L 67/00; H04L 67/02; H04L 67/06; H04L 67/10; H04L 67/20; H04L 67/34;
(Continued)

(56) References Cited

U.S. PATENT DOCUMENTS 9,830,449 B1 * 11/2017 Wagner ............... G06F 9/45508
9,992,260 B1 *  6/2018 McMullen ............. H04L 67/34
(Continued)

FOREIGN PATENT DOCUMENTS

CN      104137057 A     11/2014
CN      104935660 A      9/2015
(Continued)

OTHER PUBLICATIONS

"Telecommunications and Internet converged Services and Protocols for Advanced Networking (TISPAN); Content Delivery Network (CDN) architecture—Interconnection with TISPAN IPTV architectures; ETSI TS 182 019", ETSI Draft; ETSI TS 182 019, European Telecommunications Standards Institute (ETSI), 650, Route Des Lucioles; F-06921 Sophia-Antipolis; France, vol. zArchive—TISPAN, No. V0.2.1, Dec. 16, 2009 (Dec. 16, 2009), pp. 1-44, XP014195004.
(Continued)

*Primary Examiner* — James N Fiorillo
(74) *Attorney, Agent, or Firm* — Husch Blackwell LLP

(57) ABSTRACT

A request processing method and apparatus, an electronic device, and a computer storage medium are provided, which are related to the technical field of cloud computing. The request processing method includes: receiving a content delivery network (CDN) request; acquiring a dynamic code corresponding to the CDN request, wherein the dynamic code is a pre-configured code; compiling the dynamic code in real time to obtain a compiled code; and executing the compiled code. The request processing method provided in an embodiment of the present application may improve the flexibility of request processing of a CND system, and has no concurrency limitation.

7 Claims, 8 Drawing Sheets

(51) Int. Cl.
  *G06F 9/455* (2018.01)
  *G06F 9/50* (2006.01)
  *G06F 21/56* (2013.01)
(58) Field of Classification Search
  CPC ....... H04L 67/63; H04L 67/327; H04L 29/06; G06F 8/41; G06F 8/43; G06F 8/47; G06F 8/70; G06F 9/50; G06F 9/445; G06F 9/455; G06F 9/505; G06F 9/4552; G06F 9/4484; G06F 9/45529; G06F 9/45558; G06F 21/56; G06F 11/3624
  USPC .......................................................... 709/226
  See application file for complete search history.

(56) References Cited

U.S. PATENT DOCUMENTS

| | | | | |
|---|---|---|---|---|
| 10,331,462 | B1* | 6/2019 | Varda | H04L 67/02 |
| 10,754,701 | B1* | 8/2020 | Wagner | G06F 9/5077 |
| 10,872,142 | B1* | 12/2020 | Sharma | G06F 21/44 |
| 10,979,439 | B1* | 4/2021 | Sharma | H04L 41/28 |
| 2003/0135509 | A1* | 7/2003 | Davis | H04L 67/1008 |
| 2010/0138542 | A1* | 6/2010 | Davis | G06F 9/5083 |
| | | | | 709/226 |
| 2012/0089700 | A1* | 4/2012 | Safruti | H04L 67/568 |
| | | | | 709/217 |
| 2013/0232249 | A1* | 9/2013 | Weihl | G06F 9/505 |
| | | | | 709/223 |
| 2013/0282854 | A1* | 10/2013 | Jang | H04L 67/568 |
| | | | | 709/213 |
| 2014/0344391 | A1* | 11/2014 | Varney | H04L 47/822 |
| | | | | 709/213 |
| 2016/0291951 | A1* | 10/2016 | Dahan | G06F 11/3624 |
| 2017/0257342 | A1* | 9/2017 | Mosko | H04L 61/457 |
| 2019/0272179 | A1* | 9/2019 | McMullen | H04L 67/02 |
| 2021/0026751 | A1* | 1/2021 | Larkin | G06F 11/302 |
| 2021/0297355 | A1* | 9/2021 | Bartholomew | H04L 47/125 |

FOREIGN PATENT DOCUMENTS

| | | |
|---|---|---|
| CN | 108769743 A | 11/2018 |
| CN | 109885990 A | 6/2019 |
| CN | 110727504 A | 1/2020 |
| CN | 110851135 A | 2/2020 |
| CN | 110944048 A | 3/2020 |
| CN | 111008019 A | 4/2020 |
| JP | 2005070884 A | 3/2005 |
| JP | 2011528479 A | 11/2011 |
| JP | 2015501961 A | 1/2015 |
| JP | 2018530068 A | 10/2018 |
| KR | 101665008 B | 10/2016 |
| KR | 1020170071360 A | 6/2017 |
| WO | 2019214714 A1 | 11/2019 |

OTHER PUBLICATIONS

Anonymous: "JavaScript engine—Wikipedia", Jul. 1, 2019 (Jul. 1, 2019), pp. 1-2, XP055849858, URL: http://web.archive.org/web/20190701162315/https://en.wikipedia.org/wiki/JavaScript_engine.

* cited by examiner

REQUEST PROCESSING METHOD AND APPARATUS, ELECTRONIC DEVICE, AND COMPUTER STORAGE MEDIUM

CROSS-REFERENCE TO RELATED APPLICATIONS

This application claims priority to Chinese patent application, No. 202010603582.8, entitled "Request Processing Method and Apparatus, Electronic Device, and Computer Storage Medium", filed with the Chinese Patent Office on Jun. 29, 2020, which is hereby incorporated by reference in its entirety.

TECHNICAL FIELD

The present application relates to a field of computer technology, and in particular, to a technical field of edge systems.

BACKGROUND

An acronym for a content delivery network is CDN. The CDN is an intelligent virtual network built on the basis of the existing network, in which a user can obtain the required content nearby depending on edge servers deployed in different places and by function modules of a central platform, such as for load balancing, content distribution and scheduling, so as to reduce network congestion and improve the response speed and hit rate of user access. In a CDN edge system, static customization calculation is generally performed using a script language, such as Lua language, which requires static deployment of relevant codes to all edge nodes and requires the edge system to reload these codes.

SUMMARY

A request processing method and apparatus, an electronic device, and a storage medium are provided according to embodiments of the present disclosure.

In an aspect of the present disclosure, a request processing method is provided according to an embodiment of the present disclosure, which includes:
receiving a content delivery network (CDN) request;
acquiring a dynamic code corresponding to the CDN request, wherein the dynamic code is a pre-configured code;
compiling the dynamic code in real time to obtain a compiled code; and
executing the compiled code.

In an aspect of the present disclosure, a request processing apparatus is provided according to an embodiment of the present disclosure, which includes:
a request receiving module configured for receiving a content delivery network (CDN) request;
an acquiring module configured for acquiring a dynamic code corresponding to the CDN request, wherein the dynamic code is a pre-configured code;
a compiling module configured for compiling the dynamic code in real time to obtain a compiled code; and
an executing module configured for executing the compiled code.

In another aspect of the present disclosure, an electronic device is provided according to an embodiment of the present disclosure, which includes:
at least one processor; and
a memory communicatively connected to the at least one processor, wherein
the memory stores instructions executable by the at least one processor, the instructions are executed by the at least one processor to enable the at least one processor to execute the method provided in any embodiment of the present application.

In another aspect of the present disclosure, a non-transitory computer-readable storage medium storing computer instructions is provided according to an embodiment of the present disclosure, where the computer instructions, when executed by a computer, cause the computer to perform the method provided in any embodiment of the present application.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the present solution and do not constitute definition to the present application. In the drawings.

DETAILED DESCRIPTION OF THE EMBODIMENT(S)

The exemplary embodiments of the present application are described below in conjunction with the accompanying drawings, which include various details of the embodiments of the present application to facilitate understanding, and should be regarded as merely exemplary. Therefore, those ordinarily skilled in the art should realize that various changes and modifications may be made to the embodiments described herein without departing from the scope and spirit of the present application. Likewise, for clarity and conciseness, descriptions of well-known functions and structures are omitted in the following description.

It should be noted that the embodiments in the present application and the features in the embodiments may be combined with each other without conflict.

Figure 1:
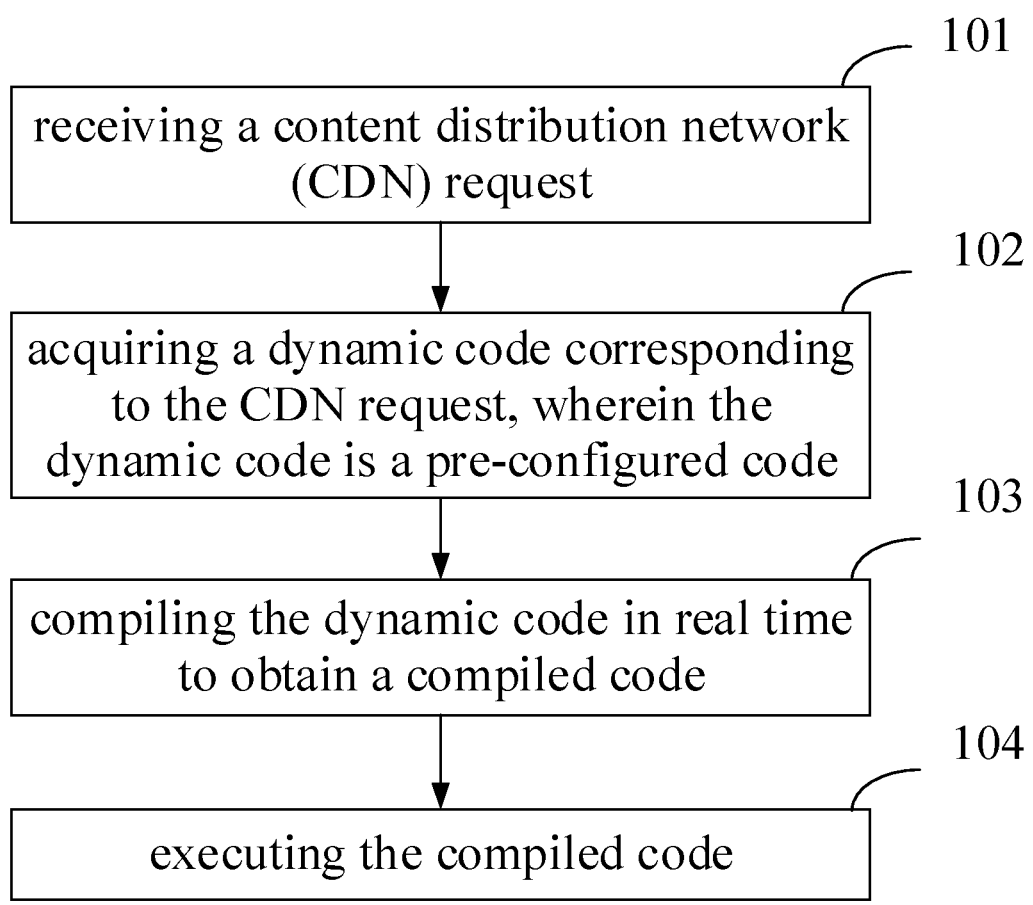
FIG. 1 is a schematic diagram of a request processing method according to an embodiment of the present application.

FIG. 1 is a flow chart of a request processing method according to an embodiment of the present application. As shown in FIG. 1, the method includes:

S101, receiving a content delivery network (CDN) request;

S102, acquiring a dynamic code corresponding to the CDN request, wherein the dynamic code is a pre-configured code;

S103, compiling the dynamic code in real time to obtain a compiled code; and

S104, executing the compiled code.

In this embodiment, the CDN request may be a request sent by a user to a CDN edge node, for deploying CDN codes. The specific content of the CDN request may be customized by a customer of the CDN system.

Acquisition of the dynamic code corresponding to the CDN request may be customized by the user through, for example, file name rewriting, cross-domain header addition, referrer black-and-white list, speed limit feedback control, a 404 custom page, AB Test control. The content of the CDN request may be used to obtain the dynamic code. For example, the user requests to rewrite a file name, sends a CDN request about a CDN node, determines a CDN node according to the CDN request, and acquires a corresponding dynamic code for rewriting the file name from the CDN node. Meanwhile, in the embodiment of the present application, the request of the user is executed through the dynamic code, which provides a general-purpose flexible CDN edge system control capability; and the dynamic code may be acquired on CDN edge nodes inside the CDN edge system, with no concurrency restriction, and with high natural performance and less resource occupancy.

In the embodiment of the present application, the dynamic code is used for deployment, and may be changed at any time during the running of the program, so that the flexibility of code deployment of the CDN system is improved, the customization degree of the dynamic code is high, and the research and development cost is reduced.

In this embodiment, the dynamic code is a content in a code that may be defined by the user himself, such as whether to perform caching, whether to use an anti-theft chain, and the like.

In this embodiment, the compiled code may be a code in a language format executable on a CDN node.

In this embodiment, the dynamic code is compiled in real time to obtain the compiled code. Specifically, the dynamic code in a first language format is compiled in real time, so that the dynamic code in the first language is converted into the compiled code in a second language format. For example, the dynamic code in a JavaScript format is compiled in real time so as to be converted into the compiled code in a C language format.

In this embodiment, the dynamic code may be obtained according to the CDN request sent by the user, and then compiled into a code executable by the CDN system, so that the user may customize a deployed code of the CDN system, and set some parameters according to his own needs to realize the customizability of the code in the CDN system. This embodiment supports abundant scenarios where the popular JavaScript language may be used, which achieves a high degree of customization and reduces the research and development cost.

In an embodiment, the request processing method includes:

receiving a content delivery network (CDN) request;

acquiring a dynamic code from a CDN edge node corresponding to domain name information in the CDN request;

compiling the dynamic code in real time to obtain a compiled code; and executing the compiled code.

In this embodiment, the domain name information may correspond to a CDN edge server (that is, a CDN edge node). The CDN request may be sent through a client. The dynamic code is stored in advance in the CDN edge node corresponding to the domain name information, and may be written and stored by an operation and maintenance personnel.

Specifically, in this embodiment, for example, the operation and maintenance personnel writes and stores the dynamic code, corresponding to a file name rewriting request, into the CDN edge server. The user sends a network CDN request for rewriting the file name to the CDN edge system, and determines the domain name information according to the CDN request, and acquires the dynamic code from a CDN edge system node corresponding to the domain name information.

In this embodiment, the dynamic code may be acquired from the corresponding CDN edge node according to the CDN request, so as to realize customizability of the dynamic code.

In another embodiment, the request processing method includes:

receiving a content delivery network (CDN) request;

acquiring a dynamic code corresponding to the CDN request, wherein the dynamic code is a pre-configured code;

determining whether the dynamic code includes an unsafe feature by performing static detection on the dynamic code; and performing dynamic calculation on the dynamic code to generate the compiled code in a case that a result of the static detection does not include the unsafe feature; and executing the compiled code.

In this embodiment, static detection is performed on the dynamic code, and specifically, it may be determined whether the request satisfies the configuration rule, so as to reject the illegal CDN request. For example, it is detected whether there is malicious rewriting of a web site, web site theft and the like.

In the embodiment of the present application, the static detection is performed on the dynamic code, so that it may be determined whether there is an illegal content in the code, and then the processing may be directly ended after the illegal content is detected, thereby ensuring the security of the code execution process. Thus the code risk control capability is improved.

In another embodiment of the present application, the request processing method includes:

receiving a content delivery network (CDN) request;

acquiring a dynamic code corresponding to the CDN request, wherein the dynamic code is a pre-configured code;

determining whether the dynamic code includes an unsafe feature by performing static detection on the dynamic code;

creating a Java Script (JS) virtual machine for executing the CDN request in the case that a result of the static detection does not include the unsafe feature;

adding a third dynamic code, generated by combining dynamic codes, into the JS virtual machine;

compiling the dynamic code in real time to generate the compiled code; and executing the compiled code.

In this embodiment, the JS virtual machine for executing the CDN request is created, and specifically, a program JavaScript virtual machine may be created for executing the CDN request, to provide a compiling environment for the dynamic code.

In this embodiment, the dynamic code is compiled in real time to generate the compiled code, for example, the dynamic code may be compiled in real time, so that the dynamic code in a JavaScript language may be converted into the compiled code in a C language.

In this embodiment, when the dynamic code is complied in real time, it is compiled sentence by sentence, the compiled content is put into a cache, the code is uploaded in real time, and in the JavaScript virtual machine monopolized by the life cycle of each CDN request, code execution logic is highly isolated and uncoupled.

In this embodiment, the dynamic code may be compiled in real time in the JavaScript virtual machine to generate the compiled code, so that the compiled code may be executed in real-time, thus the dynamic code customized by the user may be executed while the user requests the CND edge node, and the code execution efficiency is improved.

In the process of real-time compilation, a JavaScript compiler based on the ECMAScript standard performs compiling in real time, which is embedded deeply in the CDN edge system, and has high performance, low cost and no concurrency limitation. Use of the popular JavaScript language supports abundant scenarios, including cross-domain access, redirection, access control, IP black-and-white list, Referer black-and-white list, UA black-and-white list, speed limit, authentication, sub-request, modification request URI (Uniform Resource Identifier), modification request ARGS, modification request Header, modification request Header, and AB Test.

In an embodiment, the executing the compiled code includes:

executing the compiled code in the JS virtual machine.

In this embodiment, the compiled code is executed in the JS virtual machine such that the dynamic code customized by the user may be executed. JavaScript is a popular language, thus it supports abundant scenarios.

Figure 2:
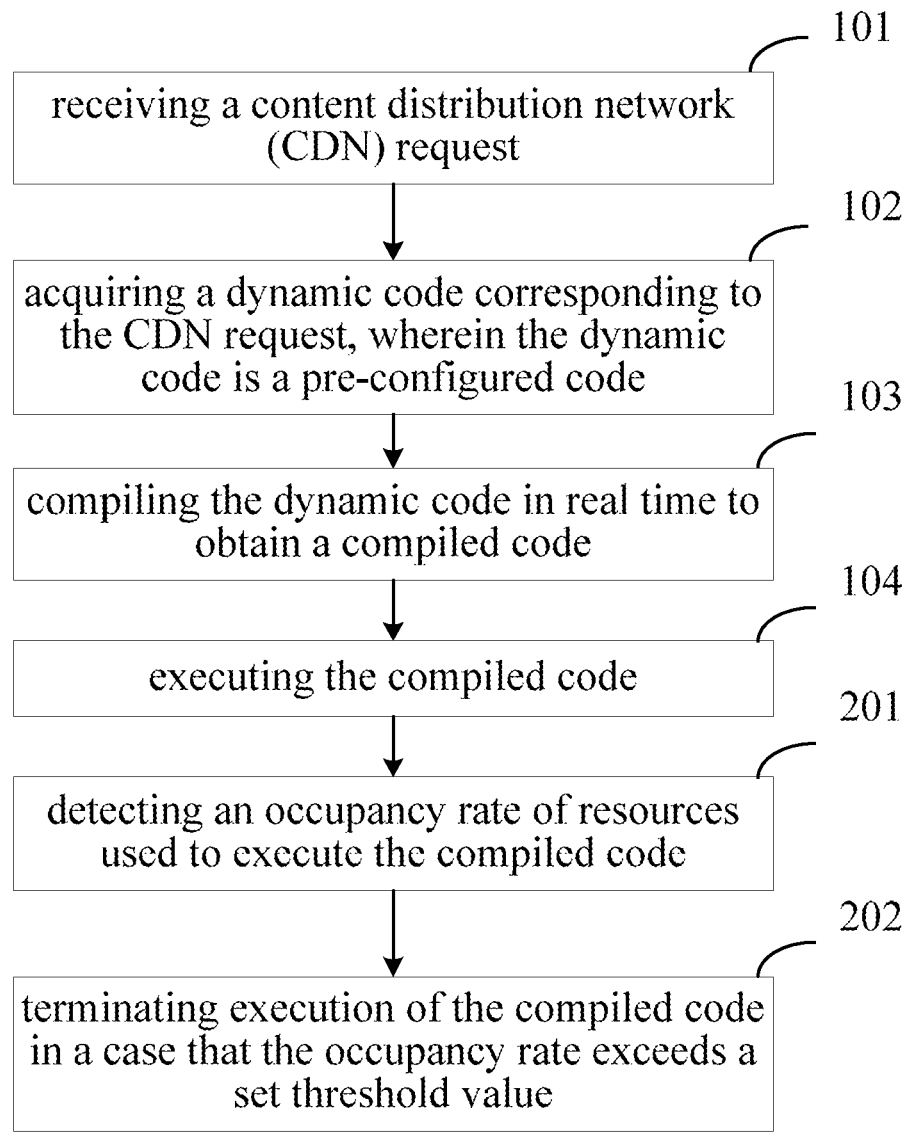
FIG. 2 is a schematic diagram of a request processing method in a scenario according to an embodiment of the present application.
Figure 3:
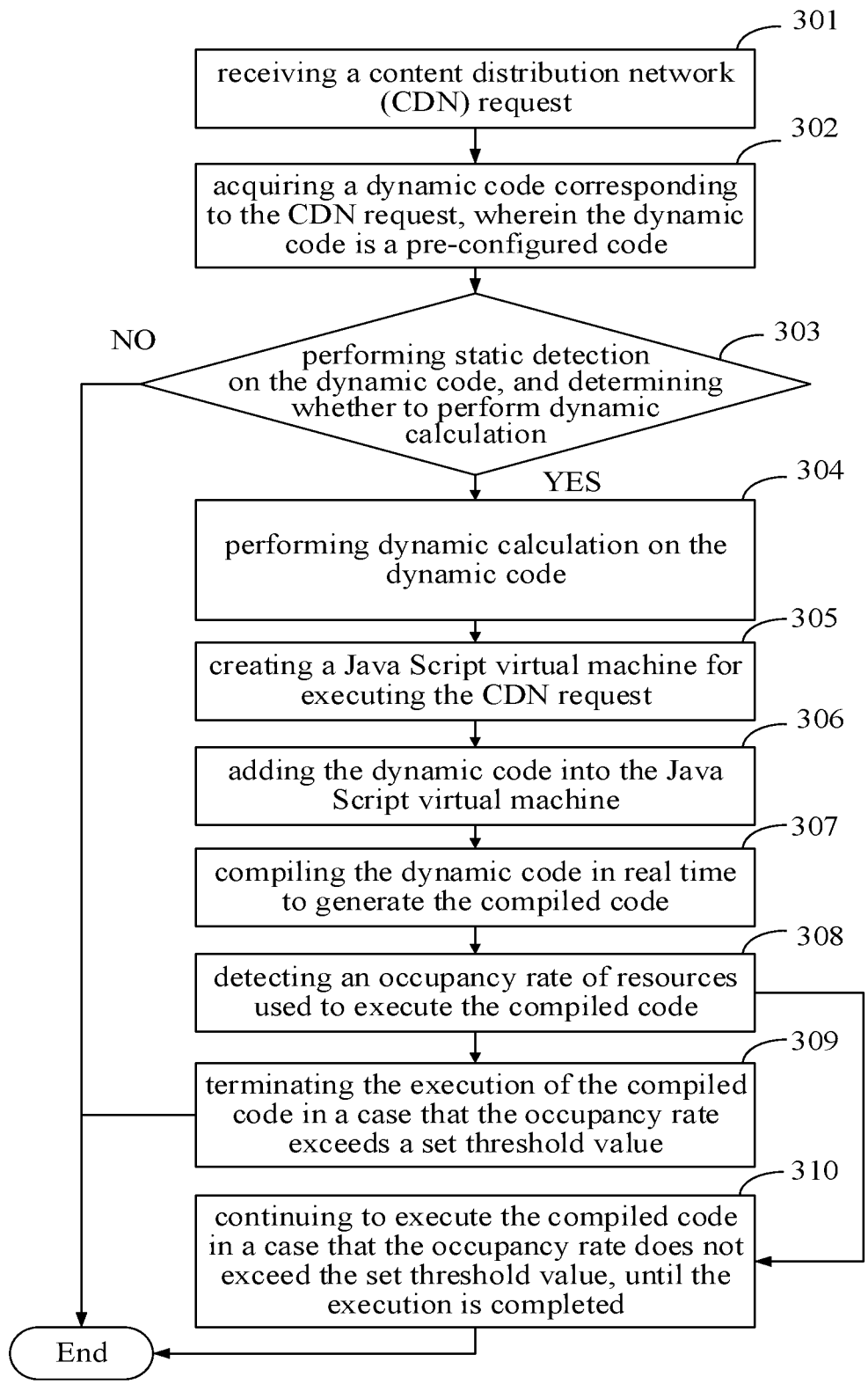
FIG. 3 is a schematic diagram of a request processing method according to an embodiment of the present application.

In another embodiment of the present application, as shown in FIG. 2, the request processing method includes:

S101, receiving a content delivery network (CDN) request;

S102, acquiring a dynamic code corresponding to the CDN request, wherein the dynamic code is a pre-configured code;

S103, compiling the dynamic code in real time to obtain a compiled code;

S104, executing the compiled code;

S201, detecting an occupancy rate of resources used to execute the compiled code; and S202, terminating execution of the compiled code in a case that the occupancy rate exceeds a set threshold value.

In this embodiment, in a case where the occupancy rate of the resources when executing the compiled code exceeds a set threshold value, the execution of the compiled code is terminated, so that it is possible to further prevent the code which is unsafe and maliciously preempts the resources from being executed, thereby improving the security of the code execution process of the edge system.

In an example of the present application, the request processing method includes S301 to S310.

At S301, a content delivery network (CDN) request is received. A CDN request may be sent through a client, such as a browser, and specifically for example, an http message request may be sent.

At S302, a dynamic code corresponding to the CDN request is acquired, wherein the dynamic code is a pre-configured code. In this example, static computation may refer to the basic service capabilities provided by the CDN, such as cache control, and the like.

At S303, static detection is performed on the dynamic code, and it is determined whether to perform dynamic calculation. It is detected whether there is a security risk in the code, and if so, the dynamic calculation will not continue to be performed.

At S304, the dynamic calculation is performed on the dynamic code in a case that it is determined to perform the dynamic calculation.

At S305, a JS virtual machine is created for executing the CDN request. In this example, if there are multiple requests, a JS virtual machine is created for each request.

At S306, the dynamic code is added into the JS virtual machine.

At S307, the dynamic code is compiled in real time to generate a compiled code.

At S308, an occupancy rate of resources used to execute the compiled code is detected.

At S309, the execution of the compiled code is terminated in the case that the occupancy rate exceeds a set threshold value. After terminating the execution of the compiled code, the request is ended and an abnormal state code is returned. When the calculation ends, it is required to continue to execute the request, for example, transferring it to the upstream.

At S310, the compiled code continues to be executed in a case that the occupancy rate does not exceed the set threshold value, until the execution is completed.

Figure 4:
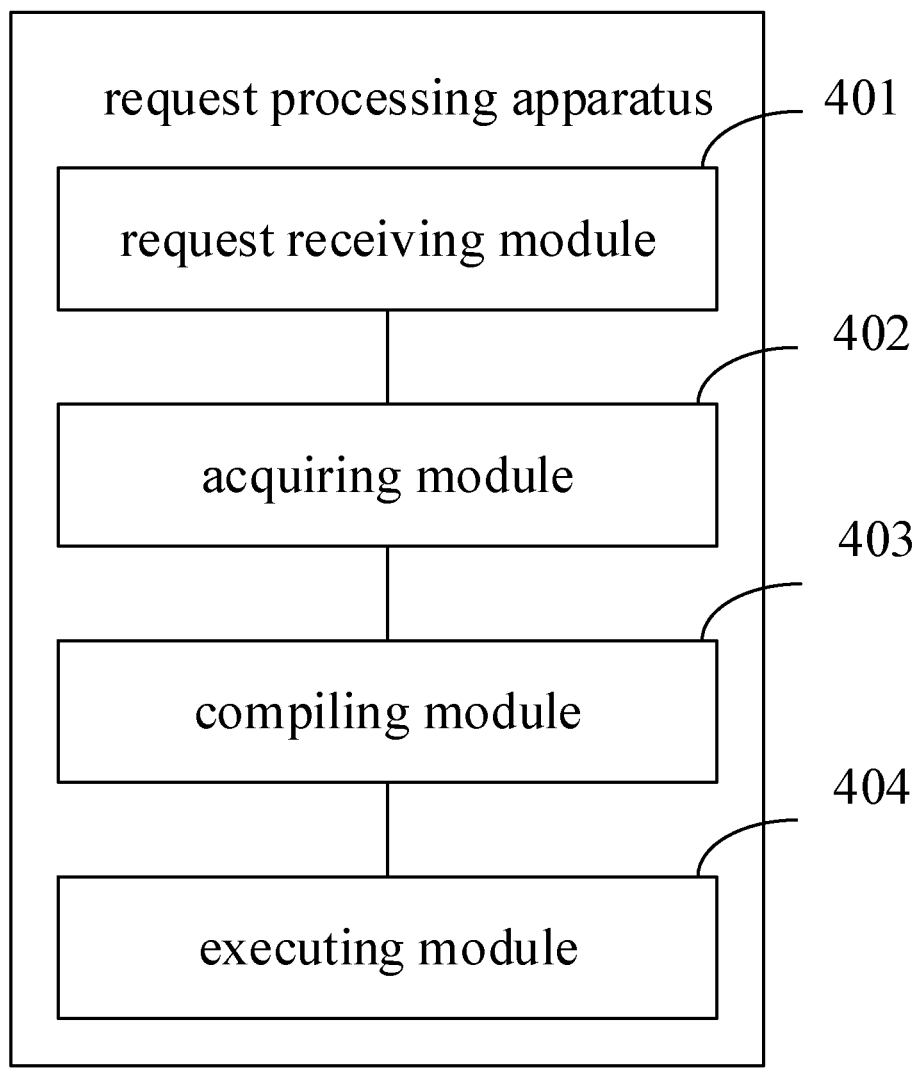
FIG. 4 is a schematic diagram of a request processing apparatus according to another embodiment of the present application.

A request processing apparatus is further provided according to an embodiment of the present application. As shown in FIG. 4, the request processing apparatus includes:

a request receiving module 401 configured for receiving a content delivery network (CDN) request;

an acquiring module 402 configured for acquiring a dynamic code corresponding to the CDN request, wherein the dynamic code is a pre-configured code;

a compiling module 403 configured for compiling the dynamic code in real time to obtain a compiled code; and an executing module 404 configured for executing the compiled code.

In an embodiment, the request processing apparatus still includes the request receiving module 401, the acquiring module 402, the compiling module 403, and the executing module 404 as shown in FIG. 4, and on the basis of this, the acquiring module is further configured for:

acquiring the dynamic code from a CDN edge node corresponding to domain name information in the CDN request.

Figure 5:
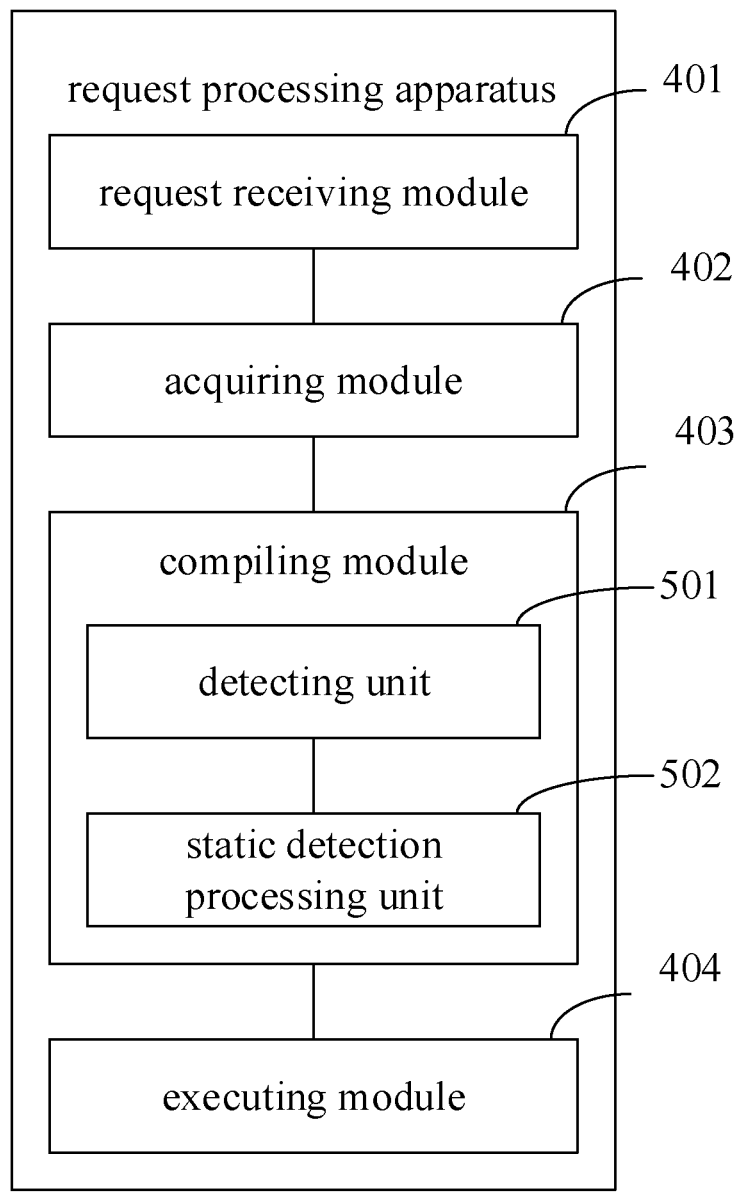
FIG. 5 is a schematic diagram of a request processing apparatus according to an embodiment of the present application.

In an embodiment, the request processing apparatus still includes the request receiving module 401, the acquiring module 402, the compiling module 403, and the executing module 404 as shown in FIG. 4, and on the basis of this, as shown in FIG. 5, the compiling module 403 further includes:

a detecting unit 501 configured for determining whether the dynamic code includes an unsafe feature by performing static detection on the dynamic code;

a static detection processing unit 502 configured for performing dynamic calculation on the dynamic code to generate the compiled code in a case that a result of the static detection does not include the unsafe feature.

Figure 6:
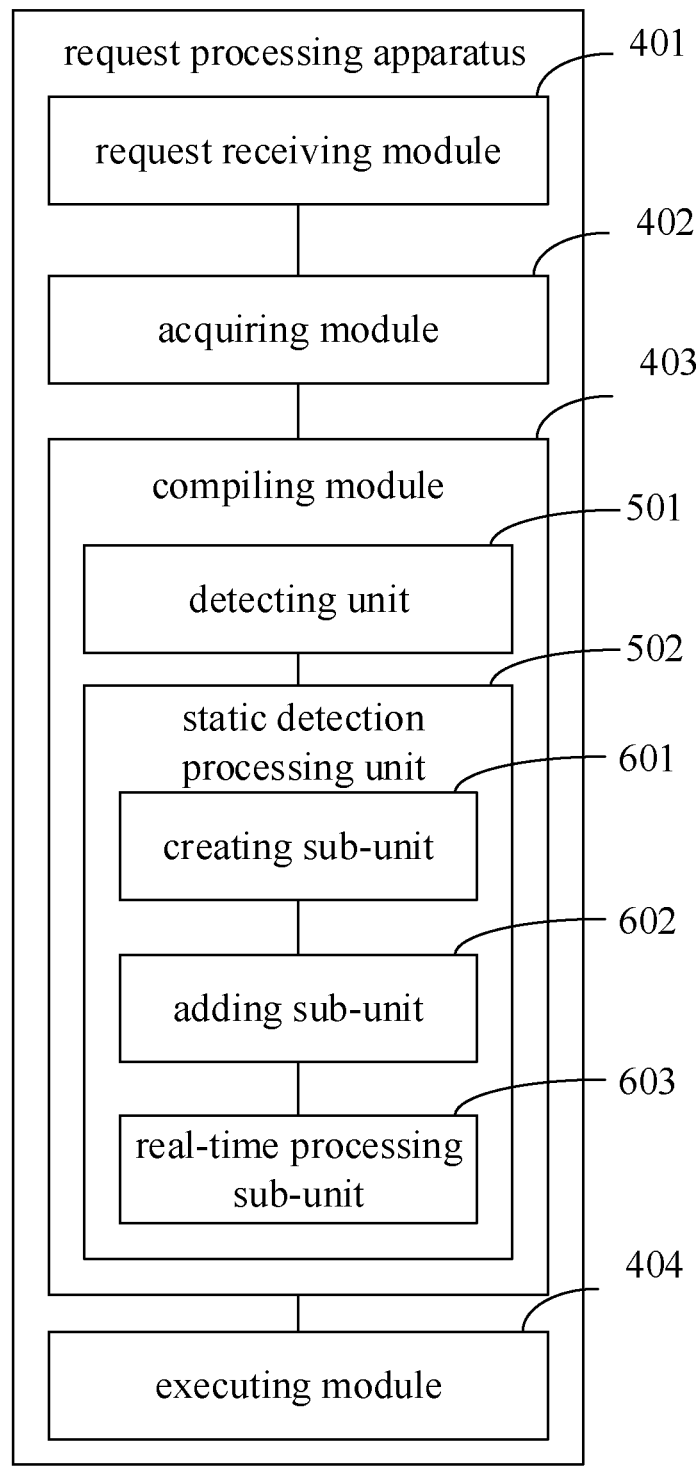
FIG. 6 is a schematic diagram of a request processing apparatus according to another embodiment of the present application.

The request processing apparatus still includes the request receiving module 401, the acquiring module 402, the compiling module 403, and the executing module 404 as shown in FIG. 4, and on the basis of this, as shown in FIG. 6, the static detection processing unit 502 further includes:

a creating sub-unit 601 configured for creating a Java Script (JS) virtual machine for executing the CDN request;

an adding sub-unit 602 configured for adding the dynamic code into the JS virtual machine; and a real-time processing sub-unit 603 configured for compiling the dynamic code in real time to generate the compiled code.

The request processing apparatus still includes the request receiving module 401, the acquiring module 402, the compiling module 403, and the executing module 404 as shown in FIG. 4, and on the basis of this, the executing module 404 is further configured for:

executing the compiled code in the JS virtual machine.

Figure 7:
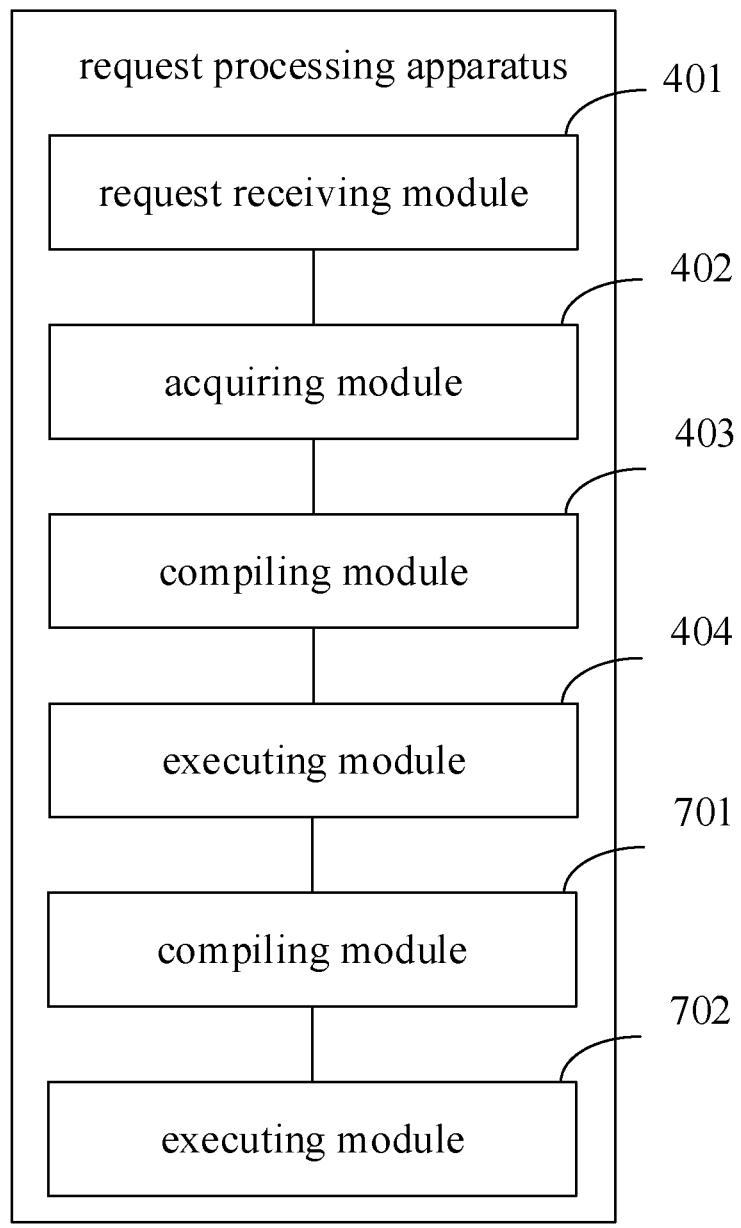
FIG. 7 is a block diagram of an electronic device used to implement a request processing method according to an embodiment of the present application.

The processing apparatus still includes the request receiving module 401, the acquiring module 402, the compiling module 403, and the executing module 404 as shown in FIG. 4, and on the basis of this, as shown in FIG. 7, the apparatus further includes:

an occupancy rate detecting module 701 configured for detecting an occupancy rate of resources used to execute the compiled code; and an execution terminating module 702 configured for terminating execution of the compiled code in the case that the occupancy rate exceeds a set threshold value.

According to embodiments of the present application, an electronic device and a readable storage medium are provided.

Figure 8:
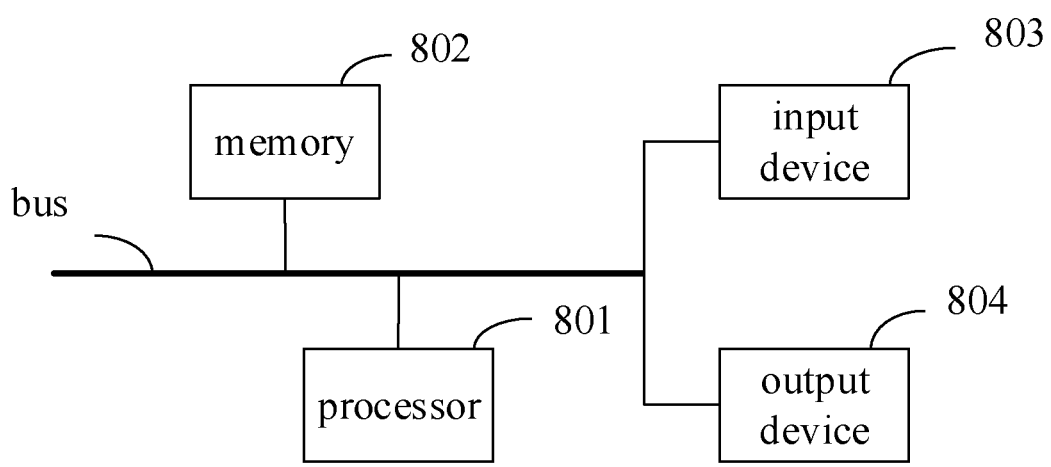
FIG. 8 is a block diagram of an example electronic device.

As shown in FIG. 8, a block diagram of an electronic device is shown for a request processing method according to an embodiment of the present application. The electronic device is intended to represent various forms of digital computers, such as a laptop computer, a desktop computer, a work table, a personal digital assistant, a server, a blade server, a mainframe computer, and other suitable computers. The electronic device can also represent various forms of mobile devices, such as personal digital processing, a cellular phone, a smart phone, a wearable device, and other similar computing devices. The components shown herein, their connections and relationships, and their functions are merely examples, and are not intended to limit the implementation of the present application described and/or required herein.

As shown in FIG. 8, the electronic device includes: one or more processors 801 and a memory 802, and interfaces for connecting the components, including a high-speed interface and a low-speed interface. The components are connected to each other by using different buses, and can be installed on a common motherboard or installed in other ways as required. The processor may process instructions executed in the electronic device, including instructions stored in or on the memory to display graphical information of GUI (Graphical User Interface) on an external input/output device (such as a display device coupled to an interface). In other embodiments, if necessary, multiple processors and/or multiple buses can be used together with multiple memories. Similarly, multiple electronic devices can be connected, and each device provides some necessary operations (for example, as a server array, a group of blade servers, or a multi-processor system). One processor 801 is taken as an example in FIG. 8.

The memory 802 is the non-transitory computer readable storage medium provided in the present application. Wherein, the memory stores instructions that can be executed by at least one processor, so that the at least one processor executes the request processing method provided in the present application. The non-transitory computer readable storage medium of the present application stores computer instructions, and the computer instructions are used to cause a computer to execute the request processing method provided in the present application.

As a non-transitory computer readable storage medium, the memory 802 can be used to store non-transitory software programs, non-transitory computer executable programs and modules, such as program instructions/modules corresponding to the request processing method in the embodiment of the present application (such as the request receiving module 401, the acquiring module 402, the compiling module 403, and the executing module 404 as shown in FIG. 4). The processor 801 executes various functional applications and data processing of the server by running the non-transitory software programs, the instructions and the modules that are stored in the memory 802, that is, implementing the request processing method in the foregoing method embodiment.

The memory 802 may include a program storage area and a data storage area, wherein the program storage area may store an operating system and an application program required by at least one function; the data storage area may store data or the like created based on use of a video request executing electronic device. Moreover, the memory 802 may include a high-speed random access memory, and may also include a non-transitory memory, such as at least one magnetic disk storage device, a flash memory device, or other non-transitory solid-state storage devices. In some embodiments, the memory 802 may optionally include a memory provided remotely with respect to the processor 801, and these remote memories may be connected to the video request executing electronic device via a network. Examples of the aforementioned network include, but are not limited to, Internet, a corporate Intranet, a local area network, a mobile communication network, and combinations thereof.

The electronic device for the request processing method may further include: an input device 803 and an output device 804. The processor 801, the memory 802, the input device 803, and the output device 804 may be connected through a bus or other methods, and in FIG. 8, for example, through a bus.

The input device 803 may receive the input numeric or character information, and generate a key signal input related to user setting and function control of the video request executing electronic device, such as a touch screen, a keypad, a mouse, a track pad, a touch pad, an indicating rod, one or more mouse buttons, trackballs, joysticks and other input devices. The output device 804 may include a display device, an auxiliary lighting apparatus (for example, an LED), a haptic feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the system and technologies described herein can be implemented in a digital electronic circuit system, an integrated circuit system, an application-specific integrated circuit (ASIC), a computer hardware, a firmware, a software, and/or combinations thereof. These various embodiments may include: being implemented in one or more computer programs, the one or more computer programs may be executed and/or compiled on a programmable system including at least one programmable processor, the programmable processor can be a dedicated or general-purpose programmable processor that can receive data and instructions from a storage system, at least one input device, and at least one output device, and transmit the data and instructions to the storage system, the at least one input device, and the at least one output device.

These computation programs (also referred to as programs, software, software application, or codes) include machine instructions of the programmable processors, and these computation programs can be implemented by using high-level procedures and/or object-oriented programming languages, and/or assembly/machine languages. As used herein, the terms "machine readable media" and "computer readable media" refer to any computer program product, device, and/or apparatus (such as a magnetic disk, an optical disk, a memory, a programmable logic device (PLD)) used to provide machine instructions and/or data to a programmable processor, including a machine readable media that receives machine instructions as machine readable signals. The term "machine readable signals" refers to any signal used to provide machine instructions and/or data to a programmable processor.

In order to provide interaction with the user, the system and technology described herein can be implemented on a computer that has: a display device for displaying information to the user (such as a CRT (cathode ray tube) or an LCD (liquid crystal display) monitor)); and a keyboard and a pointing device (such as a mouse or a trackball) through which the user can provide the input to the computer. Other types of apparatuses can also be used to provide interaction with the user; for example, the feedback provided to the user can be any form of sensing feedback (for example, visual feedback, auditory feedback, or haptic feedback); and the input from the user can be received in any form (including acoustic input, voice input, or haptic input).

The system and technology described herein may be implemented in a computing system including back-end components (for example, as a data server), or a computing system including middleware components (for example, an application server), or a computing system including front-end components (for example, a user computer having a graphical user interface or a web browser through which the user can interact with the embodiment of the system and technology described herein), or a computing system including any combination of such back-end components, middleware components or front-end components. The components of the system can be connected to each other through digital data communication (for example, a communication network) in any form or media. Examples of the communication network include: a local area network (LAN), a wide area network (WAN), and an Internet.

The computer system can include a client and a server. The client and the server are generally far away from each other and usually interact through a communication network. The relationship between the client and the server is generated by computer programs that run on the corresponding computers and have a client-server relationship with each other.

In the present application, a request may be executed by the dynamic code in the CDN system, so that the CDN system can be flexibly controlled, and the dynamic code can be acquired on CDN edge nodes inside the CDN edge system, with no concurrency restriction, and with high natural performance and less resource occupancy.

It should be understood that the various forms of processes shown above can be used to reorder, add or delete steps. For example, the steps described in the present application can be performed in parallel, or in sequence or in a different order, as long as the result desired by the technical solution disclosed in the present application can be achieved, and this is not limited herein.

The foregoing specific embodiments do not constitute limitation to the protection scope of the present application. Those skilled in the art should understand that various modifications, combinations, sub-combinations, and substitutions can be made based on design requirements and other factors. Any amendments, equivalent substitutions and improvements made within the spirit and principle of the present application are intended to be included within the protection scope of the present application.

The invention claimed is:

1. A request processing method, comprising:
   receiving a content delivery network (CDN) request;
   acquiring a dynamic code corresponding to the CDN request, wherein the dynamic code is a pre-configured code used for deployment of the request and which can be changed anytime during the deployment by a user of the CDN;
   compiling the dynamic code in real time to obtain a compiled code;
   executing the compiled code;
   detecting an occupancy rate of resources used to execute the compiled code; and
   in a case that the occupancy rate exceeds a set threshold value, terminating execution of the compiled code and returning an abnormal state code, or
   in a case that the occupancy rate does not exceed the set threshold value, continuing execution of the compiled code until the execution is completed;
   wherein the acquiring the dynamic code corresponding to the CDN request comprises:
   acquiring the dynamic code from a CDN edge node inside a CDN edge system corresponding to domain name information in the CDN request;
   wherein the compiling the dynamic code in real time to obtain the compiled code comprises:
   determining whether the dynamic code comprises an unsafe feature by performing static detection on the dynamic code; and
   performing dynamic calculation on the dynamic code to generate the compiled code in a case that a result of the static detection does not comprise the unsafe feature.

2. The request processing method according to claim 1, wherein the performing dynamic calculation on the dynamic code to generate the compiled code further comprises:
   creating a Java Script (JS) virtual machine for executing the CDN request;
   adding the dynamic code into the JS virtual machine; and
   compiling the dynamic code in real time to generate the compiled code.

3. The request processing method according to claim 2, wherein the executing the compiled code comprises:
   executing the compiled code in the JS virtual machine.

4. A request processing apparatus, comprising:
   at least one processor; and
   a memory communicatively connected to the at least one processor, wherein
   the memory stores instructions executable by the at least one processor, the instructions are executed by the at least one processor to enable the at least one processor to:
   receive a content delivery network (CDN) request;
   acquire a dynamic code corresponding to the CDN request, wherein the dynamic code is a pre-configured code used for deployment of the request and which can be changed anytime during the deployment by a user of the CDN;

compile the dynamic code in real time to obtain a compiled code;
execute the compiled code;
detect an occupancy rate of resources used to execute the compiled code; and
in a case that the occupancy rate exceeds a set threshold value, terminate execution of the compiled code and return an abnormal state code, or
in a case that the occupancy rate does not exceed the set threshold value, continue execution of the compiled code until the execution is completed;
wherein the instructions are executed by the at least one processor to further enable the at least one processor to:
acquire the dynamic code from a CDN edge node inside a CDN edge system corresponding to domain name information in the CDN request;
wherein the instructions are executed by the at least one processor to further enable the at least one processor to:
determine whether the dynamic code comprises an unsafe feature by performing static detection on the dynamic code; and
perform dynamic calculation on the dynamic code to generate the compiled code in a case that a result of the static detection does not comprise the unsafe feature.

5. The request processing apparatus according to claim 4, wherein the instructions are executed by the at least one processor to further enable the at least one processor to:
create a Java Script (JS) virtual machine for executing the CDN request;
add the dynamic code into the JS virtual machine; and
compile the dynamic code in real time to generate the compiled code.

6. The request processing apparatus according to claim 5, wherein the instructions are executed by the at least one processor to further enable the at least one processor to:
execute the compiled code in the JS virtual machine.

7. A non-transitory computer readable storage medium storing computer instructions, wherein the computer instructions cause a computer to:
receive a content delivery network (CDN) request;
acquire a dynamic code corresponding to the CDN request, wherein the dynamic code is a pre-configured code used for deployment of the request and which can be changed anytime during the deployment by a user of the CDN;
compile the dynamic code in real time to obtain a compiled code;
execute the compiled code;
detect an occupancy rate of resources used to execute the compiled code; and
in a case that the occupancy rate exceeds a set threshold value, terminate execution of the compiled code and return an abnormal state code, or
in a case that the occupancy rate does not exceed the set threshold value, continue execution of the compiled code until the execution is completed;
wherein the computer instructions cause a computer to further:
acquire the dynamic code from a CDN edge node inside a CDN edge system corresponding to domain name information in the CDN request;
wherein the computer instructions cause a computer to further:
determine whether the dynamic code comprises an unsafe feature by performing static detection on the dynamic code; and
perform dynamic calculation on the dynamic code to generate the compiled code in a case that a result of the static detection does not comprise the unsafe feature.

* * * * *